(12) United States Patent
Kugimoto et al.

(10) Patent No.: US 12,461,306 B2
(45) Date of Patent: Nov. 4, 2025

(54) OPTICAL WAVEGUIDE ELEMENT, OPTICAL MODULATION DEVICE USING OPTICAL WAVEGUIDE ELEMENT, AND OPTICAL TRANSMISSION DEVICE USING OPTICAL WAVEGUIDE ELEMENT

(71) Applicant: SUMITOMO OSAKA CEMENT CO., LTD., Tokyo (JP)

(72) Inventors: Yuki Kugimoto, Tokyo (JP); Yumi Murata, Tokyo (JP); Yu Kataoka, Tokyo (JP); Shingo Takano, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 324 days.

(21) Appl. No.: 18/270,168

(22) PCT Filed: Dec. 22, 2021

(86) PCT No.: PCT/JP2021/047528
§ 371 (c)(1),
(2) Date: Jun. 28, 2023

(87) PCT Pub. No.: WO2022/181021
PCT Pub. Date: Sep. 1, 2022

(65) Prior Publication Data
US 2024/0069281 A1 Feb. 29, 2024

(30) Foreign Application Priority Data
Feb. 26, 2021 (JP) .................. 2021-031062

(51) Int. Cl.
*G02B 6/122* (2006.01)
*G02B 6/12* (2006.01)

(52) U.S. Cl.
CPC .. *G02B 6/1228* (2013.01); *G02B 2006/12097* (2013.01); *G02B 2006/12142* (2013.01)

(58) Field of Classification Search
CPC ... G02B 6/0046; G02B 6/0048; G02B 6/1228
See application file for complete search history.

(56) References Cited

U.S. PATENT DOCUMENTS

| 10,444,433 B1 | 10/2019 | Bian |
| 2007/0036500 A1 | 2/2007 | Suzuki |

(Continued)

FOREIGN PATENT DOCUMENTS

| JP | 200772433 A | 3/2007 |
| JP | 2010230741 A | 10/2010 |

(Continued)

*Primary Examiner* — Chad H Smith
(74) *Attorney, Agent, or Firm* — IpHorgan Ltd.

(57) ABSTRACT

Provided is an optical waveguide element including spot size conversion means with suppressed optical insertion loss without complicating a manufacturing process. An optical waveguide element includes an optical waveguide substrate (4) having a rib-type optical waveguide (10) formed of a material having an electro-optic effect, and spot size conversion means for changing a mode field diameter of a light wave propagating through the optical waveguide at a position where an input end or an output end of the rib-type optical waveguide (10) is formed, in which the spot size conversion means includes a first configuration layer (1) that is connected to the rib-type optical waveguide (10) and includes a tapered portion (11) in which a width of the optical waveguide expands, a second configuration layer (2) that is laminated on the first configuration layer (1) and has a width narrower than a width of the first configuration layer (1), and a third configuration layer (3) that is disposed to cover the second configuration layer (2) excluding a part of the second configuration layer (2) close to the rib-type optical waveguide and has a width wider than the width of the second configuration layer (2).

10 Claims, 6 Drawing Sheets

(56) References Cited

U.S. PATENT DOCUMENTS

| | | |
|---|---|---|
| 2013/0170793 A1 | 7/2013 | Ushida |
| 2013/0322816 A1 | 12/2013 | Takahashi |
| 2014/0294341 A1 | 10/2014 | Hatori |
| 2015/0219844 A1 | 8/2015 | Mizutani |
| 2015/0346429 A1 | 12/2015 | Lambert |
| 2016/0047983 A1 | 2/2016 | Collins |
| 2019/0162984 A1 | 5/2019 | Sugiyama |
| 2020/0124795 A1* | 4/2020 | Cherchi ............... G02B 6/1228 |

FOREIGN PATENT DOCUMENTS

| | | |
|---|---|---|
| JP | 2014191301 A | 10/2014 |
| JP | 201642575 A | 3/2016 |
| JP | 6369036 B2 | 7/2018 |
| JP | 201995698 A | 6/2019 |
| WO | 2012042708 A1 | 4/2012 |
| WO | 2012114866 A1 | 8/2012 |
| WO | 2013146818 A1 | 10/2013 |

* cited by examiner

OPTICAL WAVEGUIDE ELEMENT, OPTICAL MODULATION DEVICE USING OPTICAL WAVEGUIDE ELEMENT, AND OPTICAL TRANSMISSION DEVICE USING OPTICAL WAVEGUIDE ELEMENT

CROSS REFERENCE TO RELATED APPLICATIONS

This application is a national stage completion application of PCT Application No. PCT/JP2021/047528, filed Dec. 22, 2021, and claims priority from Japanese Patent Application No. 2021-031062 filed Feb. 26, 2021. Each of these applications is incorporated by reference herein in its entirety.

TECHNICAL FIELD

The present invention relates to an optical waveguide element, an optical modulation device using the same, and an optical transmission apparatus, and in particular, to an optical waveguide element including an optical waveguide substrate having a rib-type optical waveguide made of a material having an electro-optic effect and spot size conversion means for changing a mode field diameter of a light wave propagating through the optical waveguide at a position where an input end or an output end of the rib-type optical waveguide is formed.

BACKGROUND ART

In the field of an optical measurement technique or in the field of an optical communication technique, an optical waveguide element, such as an optical modulator in which a material having an electro-optic effect is used for an optical waveguide is frequently used. In recent years, there is a demand for a broadband, a low drive voltage, or the like of an optical waveguide element, and for a reduction in size, a configuration in which input light of an optical waveguide element is folded back in the element and an input and an output are made in the same direction has been suggested. In a folded optical waveguide, it is necessary to reduce bending loss of waveguide light, and there is a demand for miniaturization of a mode field diameter (MFD) to about 1 μm. In a case where an optical waveguide having a narrow width is used, a modulation electrode that applies an electric field to the optical waveguide can also be disposed adjacent to the optical waveguide, and this configuration also contributes to a broadband or a low drive voltage.

Note that, in a case where an MFD in an optical waveguide element is set to about 1 μm, because an MFD of an optical fiber to be coupled to the element is 10 μm, there is a 10-fold difference in MFD between the optical waveguide in the optical waveguide element and the optical fiber. For this reason, coupling loss in a coupling portion of both the optical waveguide element and the optical fiber becomes extremely large.

Although there is a method that attaches a lens for expanding an MFD between an optical waveguide element and an optical fiber, or the like, a lens that converts the MFD from 1 μm to 10 μm by about 10 fold is impossible in terms of design. To convert the MFD with the lens, the MFD of the optical waveguide in at least an end portion of the optical waveguide element needs to be equal to or higher than 3 μm.

A configuration in which spot size conversion means (Spot Size Converter, SSC) for converting an MFD is provided near an input/output portion on the optical waveguide element, and the MFD expands to about 3 to 5 μm in the optical waveguide element has been suggested. Then, a lens is disposed between the SSC and the optical fiber to optically couple the SSC and the optical fiber.

In a SSC shown in Patent Literature Nos. 1 to 3, a rib-type optical waveguide in which a width or a thickness of an optical waveguide expands in a two-dimensional or three-dimensional manner toward an end portion of the optical waveguide is used. Although the advantage of this method is that the design is simple, there is a limit to the design that can be used because widening of the optical waveguide induces multi-mode. Furthermore, optical insertion loss cannot be sufficiently reduced due to the influence of disposition deviation of a rib shape in each layer or degradation of a surface or a side surface of each layer, in addition to a complicated manufacturing process.

CITATION LIST

Patent Literature

[Patent Literature No. 1] International Publication No. WO2012/042708
[Patent Literature No. 2] International Publication No. WO2013/146818
[Patent Literature No. 3] Japanese Patent No. 6369036

SUMMARY OF INVENTION

Technical Problem

An object to be achieved by the present invention is to solve the above-described problems and to provide an optical waveguide element including spot size conversion means with suppressed optical insertion loss without complicating a manufacturing process. Another object is to further provide an optical modulation device using the optical waveguide element and an optical transmission apparatus.

Solution to Problem

In order to solve the objects, an optical waveguide element of the present invention, an optical modulation device using the same, and an optical transmission apparatus have the following technical features.

(1) There is provided an optical waveguide element including an optical waveguide substrate having a rib-type optical waveguide made of a material having an electro-optic effect, and spot size conversion means for changing a mode field diameter of a light wave propagating through the optical waveguide at a position where an input end or an output end of the rib-type optical waveguide is formed, in which the spot size conversion means includes a first configuration layer that is connected to the rib-type optical waveguide and includes a tapered portion in which a width of the optical waveguide expands, a second configuration layer that is laminated on the first configuration layer and has a width narrower than a width of the first configuration layer, and a third configuration layer that is disposed to cover the second configuration layer excluding a part of the second configuration layer close to the rib-type optical waveguide and has a width wider than the width of the second configuration layer.

(2) In the optical waveguide element according to (1), a refractive index of a material constituting the second configuration layer is higher than a refractive index of a material constituting the first configuration layer or a material constituting the third configuration layer.

(3) In the optical waveguide element according to (1) or (2), a tip end portion of the second configuration layer of a rib-type optical waveguide side is disposed on the rib-type optical waveguide.

(4) In the optical waveguide element according to any one of (1) to (3), an end surface of the third configuration layer of a rib-type optical waveguide side is disposed to have an inclination other than 90 degrees with respect to a traveling direction of a light wave propagating through the second configuration layer.

(5) In the optical waveguide element according to any one of (1) to (4), an end surface structure of the spot size conversion means positioned on an end portion side of the optical waveguide substrate is configured such that the first configuration layer and the third configuration layer are disposed to surround the second configuration layer.

(6) In the optical waveguide element according to any one of (1) to (4), an end surface structure of the spot size conversion means positioned on an end portion side of the optical waveguide substrate is configured such that the first configuration layer and the third configuration layer are disposed not to expose the second configuration layer.

(7) In the optical waveguide element according to any one of (1) to (6), the optical waveguide substrate includes a thin plate in which the optical waveguide is formed, and a holding substrate that holds the thin plate, and a refractive index of a material constituting the holding substrate is lower than a refractive index of a material constituting the thin plate.

(8) In the optical waveguide element according to any one of (1) to (6), the optical waveguide substrate includes a thin plate in which the optical waveguide is formed, a holding substrate that holds the thin plate, and an intermediate layer between the thin plate and the holding substrate, and a refractive index of a material constituting the intermediate layer is lower than a refractive index of a material constituting the thin plate.

(9) There is provided an optical modulation device including the optical waveguide element according to any one of (1) to (8) that includes a modulation electrode for modulating the light wave propagating through the optical waveguide, an electronic circuit that amplifies a modulation signal to be input to the modulation electrode of the optical waveguide element, and a case that houses the optical waveguide element and the electronic circuit therein.

(10) There is provided an optical transmission apparatus including the optical modulation device according to (9), and an electronic circuit that outputs a modulation signal for causing the optical modulation device to perform a modulation operation.

Advantageous Effects of Invention

The present invention can make positional accuracy of disposition of each layer comparatively less stringent and can reduce the occurrence of optical insertion loss due to degradation of the surface of each layer because an optical waveguide element includes an optical waveguide substrate having a rib-type optical waveguide made of a material having an electro-optic effect, and spot size conversion means for changing a mode field diameter of a light wave propagating through the optical waveguide at a position where an input end or an output end of the rib-type optical waveguide is formed, in which the spot size conversion means includes a first configuration layer that is connected to the rib-type optical waveguide and includes a tapered portion in which a width of the optical waveguide expands, a second configuration layer that is laminated on the first configuration layer and has a width narrower than a width of the first configuration layer, and a third configuration layer that is disposed to cover the second configuration layer excluding a part of the second configuration layer close to the rib-type optical waveguide and has a width wider than the width of the second configuration layer.

BRIEF DESCRIPTION OF DRAWINGS

FIG. 2A is a cross-sectional view taken along a one-dot chain line A-A', FIG. 2B is a cross-sectional view taken along a one-dot chain line B-B', FIG. 2C is a cross-sectional view taken along a one-dot chain line C-C', and FIG. 2D is a cross-sectional view taken along a one-dot chain line D-D'.

FIG. 6A is a cross-sectional view taken along a one-dot chain line E-E' and FIG. 6B is a cross-sectional view taken along a one-dot chain line F-F'.

DESCRIPTION OF EMBODIMENTS

Hereinafter, an optical waveguide element of the present invention will be described in detail using a suitable example.

In the following description, while a structure of spot size conversion means of an optical waveguide will be described mainly focusing on an output end, it is needless to say that an input end can also be configured in the same manner.

Figure 1:
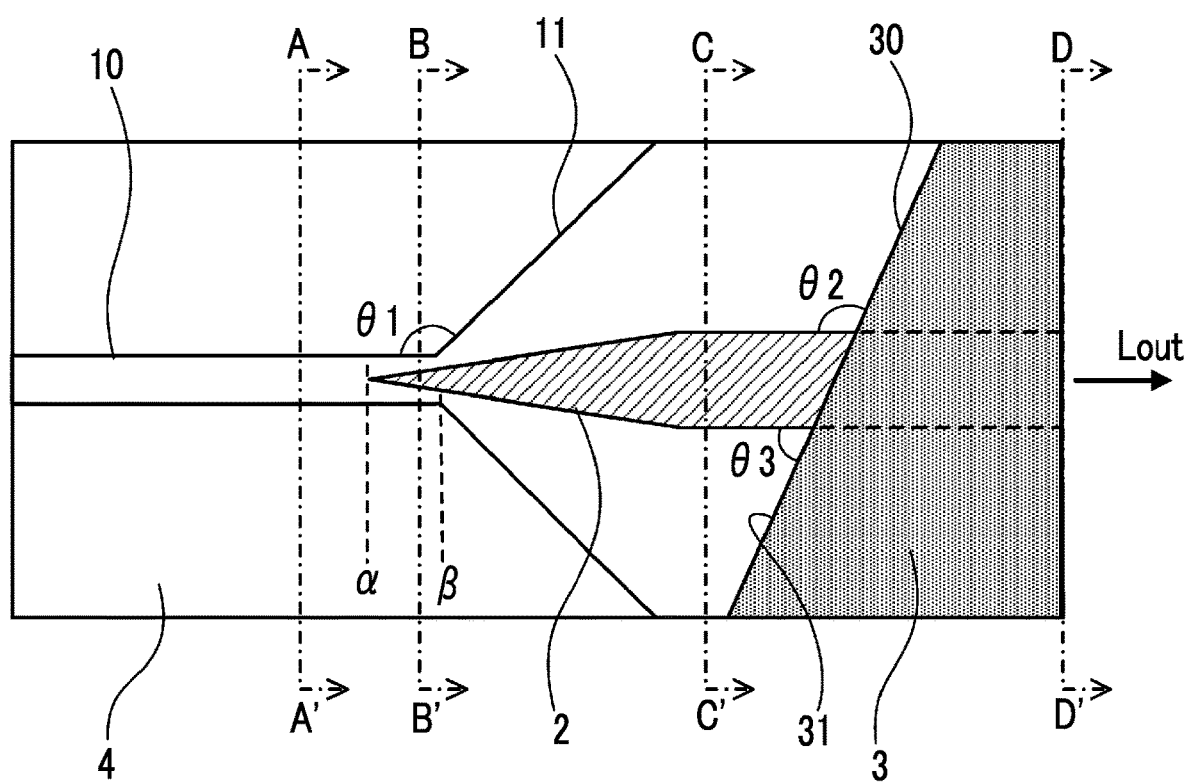
FIG. 1 is a plan view showing a first example of an optical waveguide element of the present invention.

As shown in FIGS. 1 and 2, the optical waveguide element of the present invention includes an optical waveguide substrate (1, 4) having a rib-type optical waveguide 10 formed of a material having an electro-optic effect, and spot size conversion means for changing a mode field diameter of a light wave propagating through the optical waveguide at a position where an input end or an output end of the rib-type optical waveguide 10 is formed, in which the spot size conversion means includes a first configuration layer (1) that is connected to the rib-type optical waveguide 10 and includes a tapered portion 11 in which a width of the optical waveguide expands, a second configuration layer (2) that is laminated on the first configuration layer and has a width narrower than a width of the first configuration layer, and a third configuration layer (3) that is disposed to cover the second configuration layer excluding a part of the second configuration layer close to the rib-type optical waveguide and has a width wider than the width of the second configuration layer.

As the material constituting the optical waveguide that is used in the optical waveguide element of the present invention, a substrate of a ferroelectric material having an electro-optic effect, specifically, lithium niobate (LN), lithium tantalate (LT), lead lanthanum zirconate titanate (PLZT), or the like, an epitaxial film made of such materials, or the like can be used. Various materials, such as a semiconductor material or an organic material, can also be used as a substrate of the optical waveguide element.

A thickness H1 of the optical waveguide 10 that is used in the present invention is extremely thin to be equal to or smaller than 1 μm, and there is a method of mechanically polishing and thinning a crystal substrate, such as LN, or a method using an epitaxial film, such as LN. In a case of the epitaxial film, for example, the epitaxial film is formed by a sputtering method, a CVD method, a sol-gel method, or the like according to the crystal orientation of a single crystal substrate, such as a $SiO_2$ substrate, a sapphire single crystal substrate, or a silicon single crystal substrate.

Figure 2A:
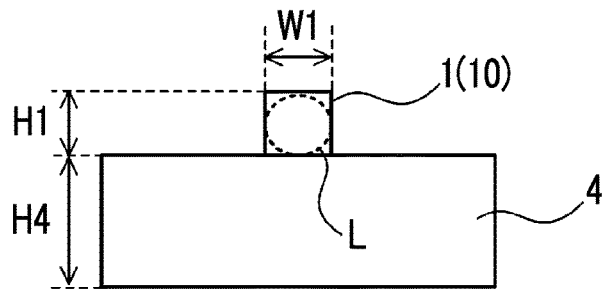
FIGS. 2A to 2D are cross-sectional views of the optical waveguide element of FIG. 1.
Figure 3:
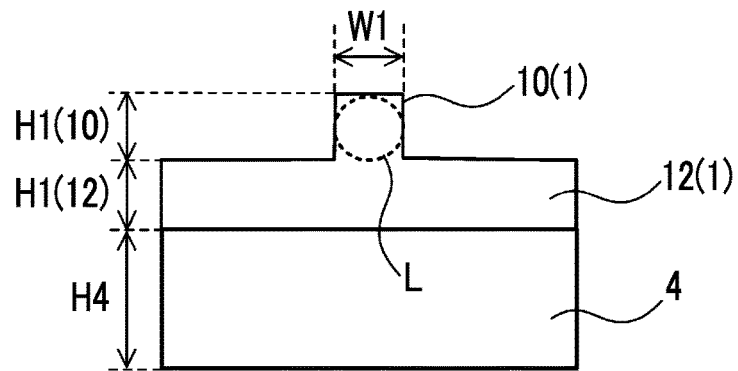
FIG. 3 is a diagram showing another example of an optical waveguide substrate.

As shown in FIG. 3, because a thickness (a thickness obtained by adding H1(10) and H1(12) of FIG. 3) of a substrate constituting the first configuration layer 1 including the optical waveguide 10 is extremely thin, for example, about 2 to 3 μm, to increase mechanical strength of the optical waveguide element, a holding substrate 4 is disposed on a back surface side of the first configuration layer 1. The holding substrate 4 may be formed of a material, such as a $SiO_2$ substrate, with a refractive index lower than the first configuration layer 1 (optical waveguide 10). In bonding the first configuration layer 1 and the holding substrate 4, direct bonding or a method of bonding using an adhesive can also be used. An intermediate layer is used between the first configuration layer and the holding substrate, whereby alternatives of the holding substrate can be widened. For example, in a case where $SiO_2$ with a lower refractive index and a lower dielectric constant than LN is formed as the intermediate layer to have a thickness of several μm, Si, alumina, or the like with a high refractive index can be used as the holding substrate. On the other hand, as shown in FIG. 2A, the holding substrate 4 may be used as a base of crystal growth, and the first configuration layer 1 constituting the optical waveguide 10 of the epitaxial film may be provided.

As a method for forming a rib-type protrusion constituting the optical waveguide 10, a method of forming the protrusion by dry or wet etching a layer (for example, an LN layer) forming the optical waveguide can be used. In addition, in order to increase the refractive index of the rib portion, a method of thermally diffusing a high refractive index material, such as Ti, to the position of the rib portion can also be used together.

As shown in FIG. 1 and FIGS. 2A to 2D that are cross-sectional views taken along a one-dot chain line (A-A' and the like) shown in FIG. 1, the spot size conversion means (SSC) that is a feature of the optical waveguide element of the present invention includes the first configuration layer (1) that is connected to the rib-type optical waveguide 10 and includes the tapered portion 11 in which the width of the optical waveguide expands, the second configuration layer (2) that is laminated on the first configuration layer and has a width narrower than a width of the first configuration layer, and the third configuration layer (3) that is disposed to cover the second configuration layer excluding a part of the second configuration layer close to the rib-type optical waveguide and has a width wider than the width of the second configuration layer.

A refractive index of a material constituting the second configuration layer (2) is higher than a refractive index of a material constituting the first configuration layer (1) and a material constituting the third configuration layer (3). The first configuration layer (1) and the third configuration layer (3) may be formed of materials having the same refractive index as necessary. Specifically, as described above, the first configuration layer may be a crystal, such as lithium niobate or lithium tantalate, or a crystal doped with other substances. As the second configuration layer, a material containing any one of Si or Ge can be used. The third configuration layer can be formed of the same material as the first configuration layer or a material containing Ta, Nb, Ti, Zr, Ce, Zn, Sb, or Nd. Because an amount of leakage of light from the second configuration layer into overlying and underlying layers becomes even as a material to be used for the third configuration layer has a smaller difference in refractive index from the first configuration layer, symmetry in an up-down direction with the second configuration layer interposed therebetween increases in an MFD of a coupling end surface, and coupling loss can be further reduced. From this viewpoint, a difference in refractive index between the first and third configuration layers may be set to be smaller than 0.1.

Figure 2B:
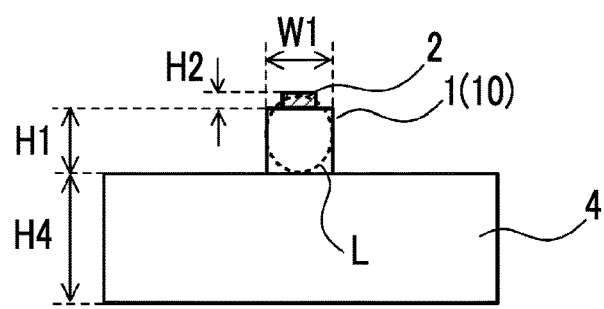

In the spot size conversion means that is used in the present invention, a spot size of the optical waveguide 10 constituting the first configuration layer (1) is widened using the tapered portion 11 in a lateral direction (a width W1 direction of FIGS. 2A and 2B). Note that, because the second configuration layer (2) with a high refractive index than the first configuration layer is disposed above the first configuration layer (1), while alight wave propagating through the first configuration layer 1 (11) is also attracted toward the second configuration layer, the spot size is expanded. With this, multi-mode does not easily occur, it is not necessary to accurately design an angle θ1 of the tapered portion, and even though the angle θ1 of the tapered portion becomes slightly smaller than a desired angle (a widening angle of the tapered portion becomes large), there is no problem.

It is effective that an effect of attracting the light wave to the second configuration layer side is generated before the optical waveguide 10 of the first configuration layer changes to the tapered portion 11. For this reason, a tip end portion α of the second configuration layer of the optical waveguide side may be disposed on the optical waveguide 10 side with respect to a connection portion β of the optical waveguide 10 and the tapered portion 11.

As shown in FIG. 2B that is a cross-sectional view taken along a one-dot chain line B-B' of FIG. 1, the second configuration layer 2 with a higher refractive index than the optical waveguide 10 (first configuration layer 1) is made to appear on the optical waveguide 10 (a size of height H1: 1 μm, width W1: 1 μm, MFD: 1 μm). Note that, because a thickness H2 of the second configuration layer 2 is extremely thin to be 50 to 100 nm, a mode is not induced in the second configuration layer, the second configuration layer is formed in such a manner that a part seeps outside the first configuration layer 1, and an MFD (indicated by a circular or elliptical dotted line L of FIGS. 2A to 2D) of the substantially same size as the optical waveguide of the first configuration layer is observed.

Figure 2C:
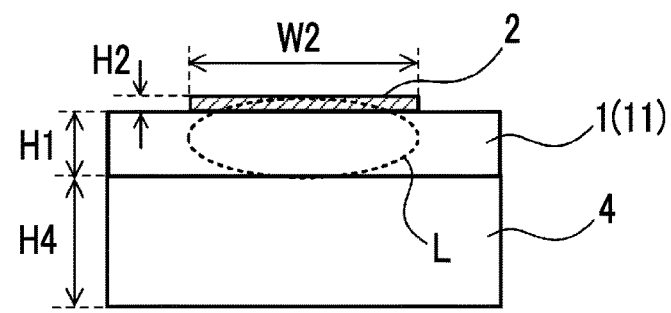

Thereafter, as shown in FIG. 1, the first configuration layer is thickened at a gentle angle, and as shown in FIG. 2C that is a cross-sectional view taken along a one-dot chain line C-C', a width W2 of the overlying second configuration layer is widened 3 to 5 µm. The width W2 of the second configuration layer is adjusted in a range of 0.05 to 5 µm by a relationship of the refractive indexes of the first configuration layer 1 and the second configuration layer 2. In a case where W2 is thinner, there is an advantage that a single mode is easily kept, but it is difficult to form the second configuration layer itself. In contrast, in a case where W2 is thicker, there is a disadvantage that a multi-mode is easily induced, but the second configuration layer is easily formed. For this reason, the second configuration layer can be created within the above-described range.

Figure 2D:
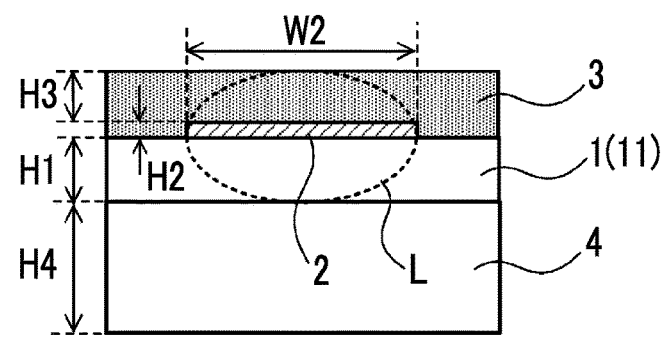

From the one-dot chain line C-C' to a one-dot chain line D-D' of FIG. 1, the third configuration layer 3 is formed to cover the second configuration layer 2. As described above, the refractive index of the third configuration layer 3 may be set to be lower than the refractive index of the second configuration layer, for example, to the same refractive index as the first configuration layer 1. As shown in FIG. 2D that is a cross-sectional view taken along the one-dot chain line D-D' of FIG. 1, an end surface structure of the spot size conversion means positioned on an end portion side of the optical waveguide substrate (1, 4) is configured such that the first configuration layer 1 and the third configuration layer 3 are disposed to surround the second configuration layer 2. In regard to the size of each configuration element, as an example, the width W2 of the second configuration layer 2 can be set to 3 to 5 µm, the thickness H1 of the first configuration layer 1 can be set to 1 µm, and a thickness H3 of the third configuration layer 3 can be set to 1 to 4 µm. In a case where the size of each configuration element is set in such a range, as shown in FIG. 2D, an MFD at an input end or an output end of a light wave L is expanded to 3 to 5 µm in a lateral direction and 2 to 5 µm in a longitudinal direction. In this way, a function as an SSC having three kinds of materials of the first configuration layer to the third configuration layer can be realized.

Figure 4:
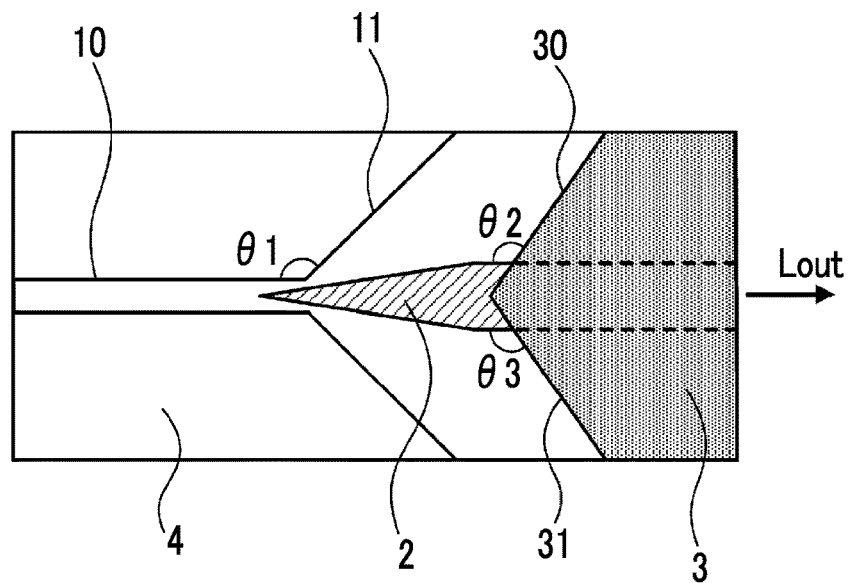
FIG. 4 is a plan view showing a second example of an optical waveguide element of the present invention.

A shape and disposition of the third configuration layer 3 may be configured such that a rapid change in refractive index is not generated with respect to the light wave propagating along the second configuration layer 2. Specifically, as shown in FIG. 1, angles (θ2 and θ3) of end surfaces (30 and 31) of the third configuration layer of the rib-type optical waveguide 10 side with respect to a propagation direction (the same direction as an arrow Lout) of the light wave are set to angles other than 90 degrees. For example, in FIG. 1, θ2 can be set to 100 to 170 degrees, and θ3 can be set to 10 to 80 degrees. θ2 and θ3 may have reversed numerical values. Although the end surfaces (30 and 31) of the third configuration layer are disposed on a straight line in FIG. 1, as shown in FIG. 4, the end surfaces and 31 may be disposed at an acute angle, and the third configuration layer may be configured to be gradually widened in width. In this case, θ3 can be set to 100 to 170 degrees.

Figure 5:
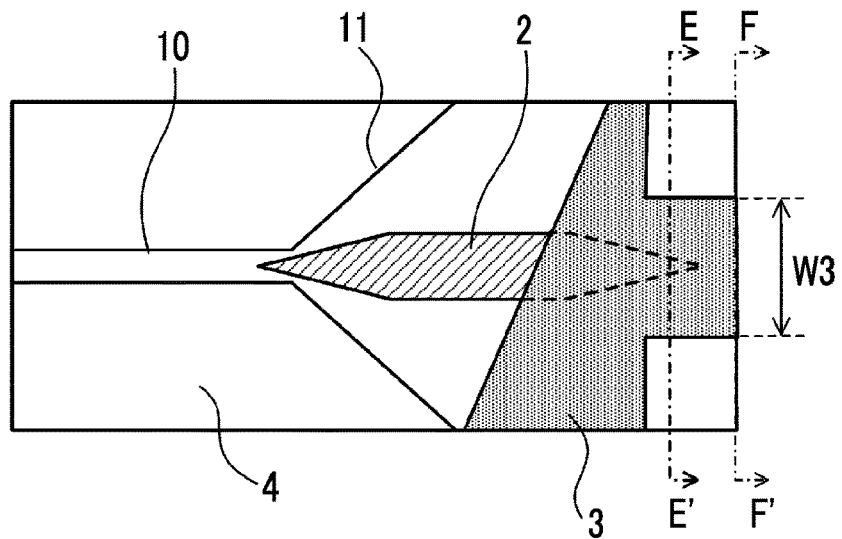
FIG. 5 is a plan view showing a third example of an optical waveguide element of the present invention.

In another example, as shown in FIGS. 5 to 8, an end surface structure of the spot size conversion means positioned on the end portion side of the optical waveguide substrate (1, 4) is configured such that the first configuration layer 1 and the third configuration layer 2 are disposed not to expose the second configuration layer 2. As shown in FIG. 5, the second structure layer 2 is gradually narrowed in width toward the end portion of the optical waveguide substrate (1, 4). In response to this, to make a confinement function of a light wave on the third configuration layer 3, as shown in FIG. 5, a width W3 of the third configuration layer is adjusted to, for example, 3 to 5 µm. This aspect is shown in FIGS. 6A and 6B that are cross-sectional views taken along one-dot chain lines E-E' and F-F' of FIG. 5. An elliptical dotted line L indicates an outline of a profile of an MFD of a light wave.

In the cross-sectional view (FIG. 6B) taken along the one-dot chain line F-F' as an input end or an output end of light, the second configuration layer 2 disappears, and a function as an SSC having two kinds of materials of the first configuration layer 1 and the third configuration layer 3 can be realized. Such a structure has an advantage that an influence of the performance of the second configuration layer 2 as a fine waveguide on the characteristic of the SSC can be suppressed and the tolerance of the manufacturing process is widened, compared to the SSC of FIG. 1. Furthermore, because an effective refractive index can be decreased with no second configuration layer 2 in the substrate end surface, it is also effective in that reflection can be reduced. In a case where the second configuration layer 2 is left in a tapered state near the input end or the output end, it is also possible to maintain a confinement effect by the second configuration layer, and to reduce an influence of side surface degradation of a ridge of the third configuration layer 3.

Figure 6A:
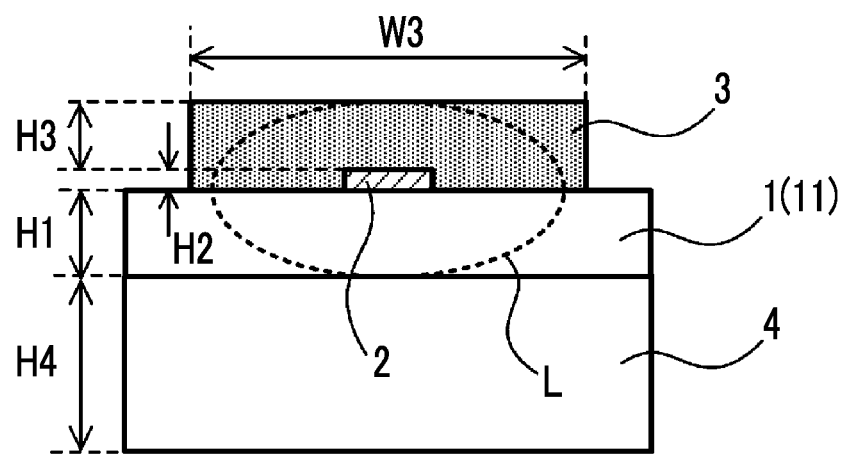
FIGS. 6A and 6B are cross-sectional views of the optical waveguide element of FIG. 5.
Figure 6B:
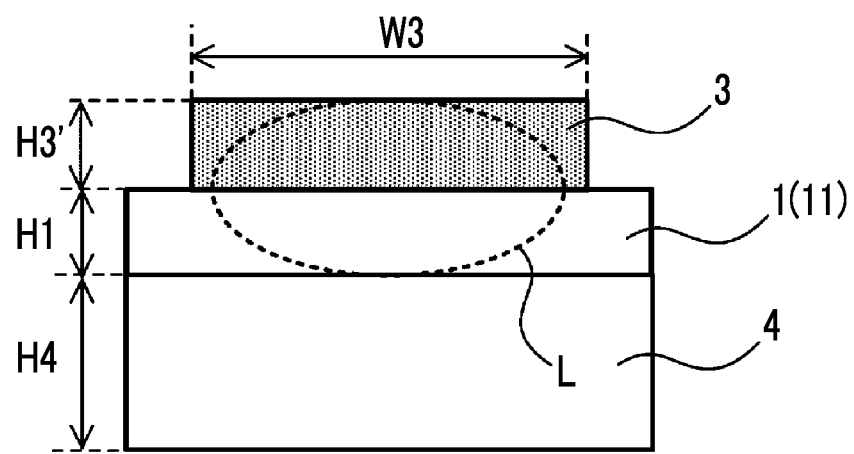
Figure 7A:
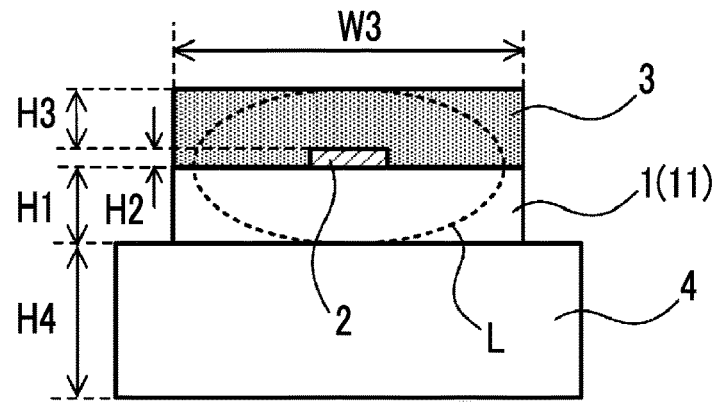
FIGS. 7A and 7B are diagrams showing another example of FIGS. 6A and 6B.
Figure 7B:
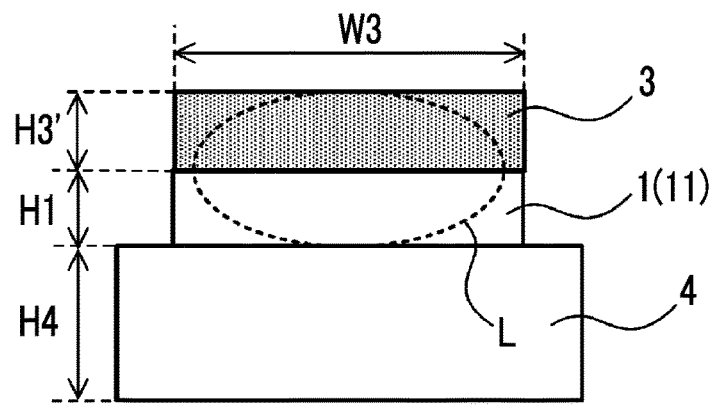
Figure 8:
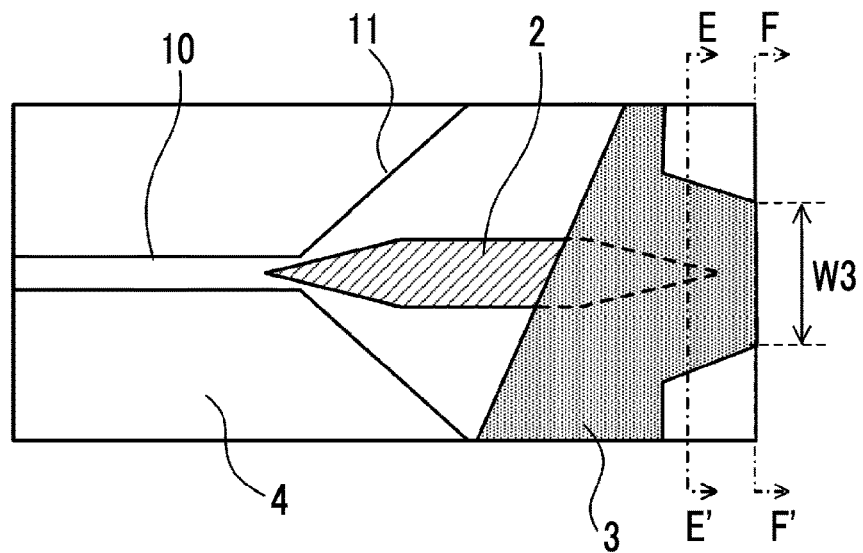
FIG. 8 is a diagram showing an application example of FIG. 5.

Instead of the cross-sectional views shown in FIGS. 6A and 6B, an example of cross-sectional views shown in FIGS. 7A and 7B may be employed. In FIGS. 7A and 7B, the width of the first configuration layer 1 changes in response to the change in width of the third configuration layer 3. With this, the first configuration layer and the third configuration layer can perform optical confinement in cooperation, and the shape of the MFD of the light wave can also be stabilized. In a case where the MFD becomes larger than an intended value when the light wave is spreading over and propagating through the first and third configuration layers, as shown in FIG. 8, a configuration in which the third configuration layer or the third and first configuration layers are gradually narrowed in width toward the input end or the output end of light may be given. Of course, the third configuration layer or the third and first configuration layer may be gradually expanded in width, and the MFD of the propagating light wave may be further expanded.

From the above, in the optical waveguide element of the present invention, the shapes and disposition of the first and third configuration layers are adjusted, whereby it is possible to make the spot size conversion means function, and to make positional accuracy of disposition of each layer comparatively less stringent. Furthermore, with the shape/disposition of the second configuration layer, it is possible to reduce the occurrence of optical insertion loss due to degradation of the surface of each layer, such as the third configuration layer.

In the above description, although a case where the configuration of each layer is a single configuration layer has been described, for example, at least one of the first to third configuration layers may be configured as a combination of two or more layers. In this case, shapes or materials may be slightly changed and setting can be suitably performed such that an appropriate MFD is obtained, in cooperation with adjacent configuration layers.

Next, an optical modulation device and an optical transmission apparatus using the optical waveguide element of the present invention will be described.

Figure 9:
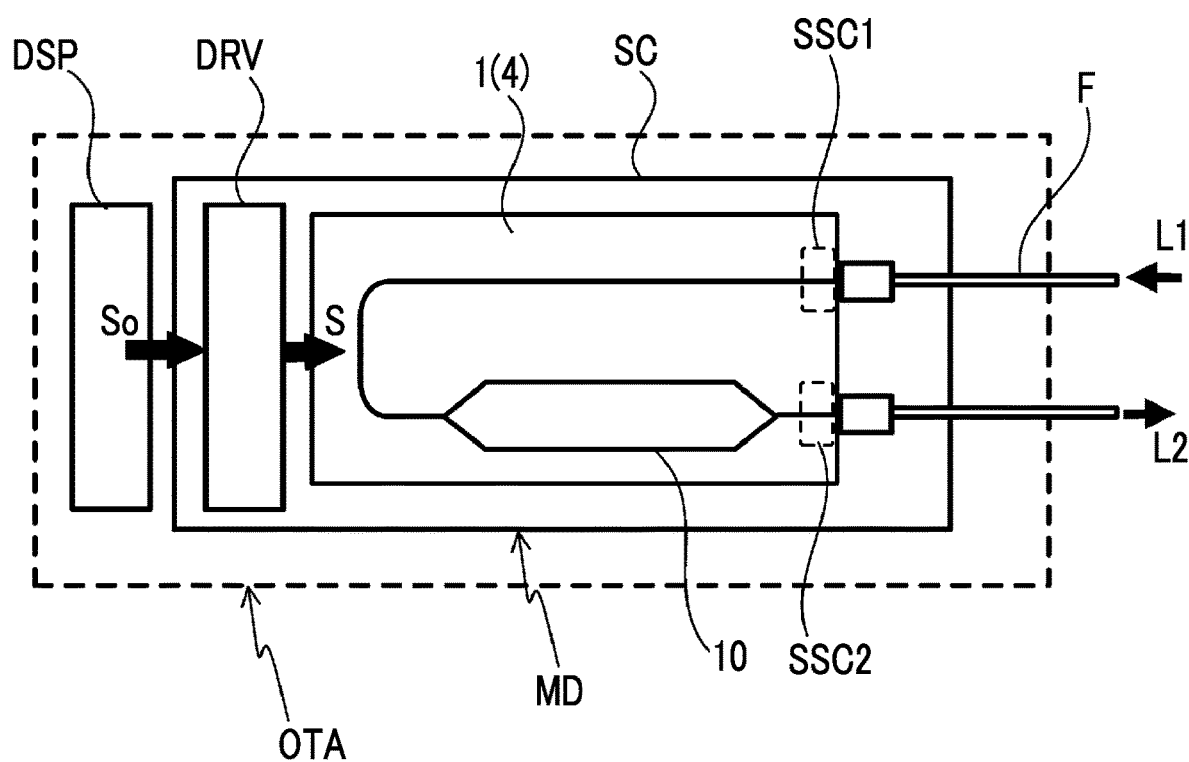
FIG. 9 is a plan view illustrating an optical modulation device and an optical transmission apparatus of the present invention.

In the above-described optical waveguide element, a modulation electrode (not shown) that modulates a light wave propagating through the optical waveguide 10 is provided on the optical waveguide substrate 1 (4) and is housed in a case SC as shown in FIG. 9. In addition, an optical fiber F through which a light wave is input to and output from the optical waveguide is provided, so that an optical modulation device MD can be configured. In FIG. 9, the optical fiber is introduced into the case through a through-hole penetrating a side wall of the case and directly bonded to the optical waveguide element. The optical waveguide element and the optical fiber can also be optically connected through a space optical system. At the input end or the output end of the optical waveguide 10, spot size conversion means (SSC1, SSC2) is provided.

An optical transmission apparatus OTA can be configured by connecting, to the optical modulation device MD, an electronic circuit (digital signal processor DSP) that outputs a modulation signal for causing the optical modulation device MD to perform a modulation operation. Because the modulation signal that is applied to the optical waveguide element needs to be amplified, a driver circuit DRV is used. The driver circuit DRV or the digital signal processor DSP may be disposed outside the case SC or may be disposed in the case SC. In particular, the driver circuit DRV is disposed in the case, so that propagation loss of the modulation signal from the driver circuit can be further reduced.

INDUSTRIAL APPLICABILITY

As described above, according to the present invention, it is possible to provide an optical waveguide element including spot size conversion means with suppressed optical insertion loss without complicating a manufacturing process. Furthermore, it is possible to provide an optical modulation device using the optical waveguide element and an optical transmission apparatus.

REFERENCE SIGNS LIST 1 optical waveguide substrate (first configuration layer)
2 second configuration layer
3 third configuration layer
4 holding substrate
10 rib-type optical waveguide
11 tapered portion
MD optical modulation device
OTA optical transmission apparatus

The invention claimed is:

1. An optical waveguide element comprising:
an optical waveguide substrate having a rib-type optical waveguide made of a material having an electro-optic effect; and
spot size conversion means for changing a mode field diameter of a light wave propagating through the optical waveguide at a position where an input end or an output end of the rib-type optical waveguide is formed,
wherein the spot size conversion means includes
a first configuration layer that is connected to the rib-type optical waveguide and includes a tapered portion in which a width of the optical waveguide expands,
a second configuration layer that is laminated on the first configuration layer and has a width narrower than a width of the first configuration layer, and
a third configuration layer that is disposed to cover the second configuration layer excluding a part of the second configuration layer close to the rib-type optical waveguide and has a width wider than the width of the second configuration layer.

2. The optical waveguide element according to claim 1, wherein a refractive index of a material constituting the second configuration layer is higher than a refractive index of a material constituting the first configuration layer or a material constituting the third configuration layer.

3. The optical waveguide element according to claim 1, wherein a tip end portion of the second configuration layer of a rib-type optical waveguide-side is disposed on the rib-type optical waveguide.

4. The optical waveguide element according to claim 1, wherein an end surface of the third configuration layer of a rib-type optical waveguide-side is disposed to have an inclination other than 90 degrees with respect to a traveling direction of a light wave propagating through the second configuration layer.

5. The optical waveguide element according to claim 1, wherein an end surface structure of the spot size conversion means positioned on an end portion side of the optical waveguide substrate is configured such that the first configuration layer and the third configuration layer are disposed to surround the second configuration layer.

6. The optical waveguide element according to claim 1, wherein an end surface structure of the spot size conversion means positioned on an end portion side of the optical waveguide substrate is configured such that the first configuration layer and the third configuration layer are disposed not to expose the second configuration layer.

7. The optical waveguide element according to claim 1, wherein the optical waveguide substrate comprises a thin plate in which the optical waveguide is formed, and a holding substrate that holds the thin plate, and a refractive index of a material constituting the holding substrate is lower than a refractive index of a material constituting the thin plate.

8. The optical waveguide element according to claim 1, wherein the optical waveguide substrate comprises a thin plate in which the optical waveguide is formed, a holding substrate that holds the thin plate, and an intermediate layer between the thin plate and the holding substrate, and a refractive index of a material constituting the intermediate layer is lower than a refractive index of a material constituting the thin plate.

9. An optical modulation device comprising:
the optical waveguide element according to any one of claims 1 to 8 that includes a modulation electrode for modulating the light wave propagating through the optical waveguide;
an electronic circuit that amplifies a modulation signal to be input to the modulation electrode of the optical waveguide element; and
a case that houses the optical waveguide element and the electronic circuit therein.

10. An optical transmission apparatus comprising:
the optical modulation device according to claim 9; and
an electronic circuit that outputs a modulation signal for causing the optical modulation device to perform a modulation operation.

* * * * *